(12) United States Patent
Hwang et al.

(10) Patent No.: US 7,838,458 B2
(45) Date of Patent: Nov. 23, 2010

(54) METHOD FOR PREPARING HIGHLY DISPERSED SUPPORTED PLATINUM CATALYST USING COMPLEX REDUCING AGENT

(75) Inventors: In Chul Hwang, Gyeonggi-do (KR); Jong Heop Yi, Seoul (KR); Pil Kim, Gyeongsangbuk-do (KR); Ji Bong Joo, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 908 days.

(21) Appl. No.: 11/635,165

(22) Filed: Dec. 6, 2006

(65) Prior Publication Data

US 2008/0073134 A1    Mar. 27, 2008

(30) Foreign Application Priority Data

Sep. 25, 2006   (KR) .................. 10-2006-0092809

(51) Int. Cl.
*B01J 21/18* (2006.01)
*B01J 23/00* (2006.01)
*B01J 23/40* (2006.01)
*B01J 23/74* (2006.01)
*B01J 23/42* (2006.01)
*B01J 23/44* (2006.01)
*H01M 4/88* (2006.01)

(52) U.S. Cl. .............. 502/185; 502/101; 502/180; 502/182; 502/339

(58) Field of Classification Search .......... 502/101, 502/180, 182, 185, 339
See application file for complete search history.

(56) References Cited

U.S. PATENT DOCUMENTS

| 6,462,095 | B1 * | 10/2002 | Bonsel et al. ............. 516/97 |
| 6,518,217 | B2 | 2/2003 | Xing et al. |
| 6,551,960 | B1 * | 4/2003 | Laine et al. ............. 502/327 |
| 6,686,308 | B2 | 2/2004 | Mao et al. |
| 6,815,391 | B2 | 11/2004 | Xing et al. |
| 7,205,255 | B2 * | 4/2007 | Yamamoto ............. 502/101 |
| 7,335,245 | B2 * | 2/2008 | He et al. ............. 75/351 |
| 7,479,469 | B2 * | 1/2009 | Ishihara et al. ............. 502/185 |
| 2003/0187294 | A1 | 10/2003 | Hagemeyer et al. |
| 2004/0087441 | A1 * | 5/2004 | Bock et al. ............. 502/313 |
| 2007/0149396 | A1 * | 6/2007 | Lo et al. ............. 502/339 |

FOREIGN PATENT DOCUMENTS

JP        2008-080322    *   4/2008

(Continued)

OTHER PUBLICATIONS

"Preparation and formation mechanisms of uniform metallic particles in homogeneous solutions," Dan V. Goia. Journal of Materials Chemistry (2004), 14, pp. 451-458.*

(Continued)

*Primary Examiner*—Patricia L Hailey
(74) *Attorney, Agent, or Firm*—Edwards Angell Palmer & Dodge LLP; Peter F. Corless

(57) ABSTRACT

The present invention relates to a method for preparing a highly dispersed supported platinum catalyst, which comprises the step of adding a reducing agent to a mixture of a platinum precursor and a carbon support, wherein the reducing agent is prepared by mixing ethylene glycol and sodium borohydride.

6 Claims, 4 Drawing Sheets

FOREIGN PATENT DOCUMENTS

KR 10-2005-0094501 9/2005
KR 10-2006-0037619 5/2006

OTHER PUBLICATIONS

"Pt-Co supported on single-walled carbon nanotubes as an anode catalyst for direct methanol fuel cells," Jianfeng Shen et al. Electrochimica Acta 53 (2008), pp. 7276-7280.*

"Effect of synthetic reducing agents on morphology and ORR activity of carbon-supported nano-Pd-Co alloy electrocatalysts," Lei Zhang et al. Electrochimica Acta 52 (2007), pp. 7964-7971.*

Kim et al., Journal of Power Sources, Power-7928, No. of pp. 4.

Li et al., Carbon, 43:2168-2174 (2005).

Ma et al., Applied Surface Science, APSUSC-13563, No. of pp. 5.

* cited by examiner

METHOD FOR PREPARING HIGHLY DISPERSED SUPPORTED PLATINUM CATALYST USING COMPLEX REDUCING AGENT

CROSS-REFERENCE TO RELATED APPLICATIONS

This application claims the benefit of Korean Patent Application No. 10-2006-0092809, filed on Sep. 25, 2006, in the Korean Intellectual Property Office, the disclosure of which is incorporated herein by reference.

BACKGROUND OF THE INVENTION

1. Field of the Invention

The present invention relates to a method for preparing a highly dispersed supported platinum catalyst, and more particularly to a method for preparing a highly dispersed supported platinum catalyst in which a reducing agent prepared by mixing ethylene glycol and sodium borohydride is added to a mixture of a platinum precursor and a carbon support.

2. Background

A fuel cell is a power generating unit converting chemical energy of a fuel into electrical energy. The fuel cell is an alternative energy having an excellent efficiency as compared with a conventional internal combustion engine and rarely discharging contamination material. The fuel cell can be used to a wide range of applications including a computer, a camcorder, and a mobile phone, a power source of a vehicle, a train, a ship, or a submarine, a power supplying and heating unit for home, and a small or middle-sized power plant. Recently, the fuel cell has been intensively developed as a power source of a vehicle and also has been concerned as a power source of a mobile phone.

The fuel cell includes an oxidation electrode, a reduction electrode, and an electrolyte and generates electrical energy by using the catalyst reaction of the oxidation and the reduction electrodes and penetration of ions in the electrolyte. Hydrogen ions generated by oxidizing the fuel injected in the oxidation electrode are introduced into an electrolyte membrane. In the reduction electrode, the hydrogen ions supplied from the electrolyte membrane, the oxygen injected to the reduction electrode, and electrons supplied from the oxidation electrode are reacted to produce water. A metal having an excellent electrochemical reaction activity such as platinum is used as an electrode catalyst to generate the electrode reactions at a low temperature. However, although platinum is a single catalyst capable of expediting oxidation of a fuel (hydrogen or alcohol) and reduction of oxygen to near 100° C. from a normal temperature, since the platinum should be buried as less as possible and the price of platinum is high, it is important to maximize the activity per unit weight. In order to accomplish this, the reaction activity area should be maximized by regulating the size of particles in the range of nano sizes. If the thickness of the catalyst layer increases in the fuel cell, the diffusion resistance of a reactant or a product increases, thereby decreasing the overall efficiency of the fuel cell. Therefore, a highly supported catalyst containing larger amount of platinum as compared with a support body capable of reducing the thickness of the catalyst layer is necessary. But as the amount of contained platinum increases, the sizes of platinum particles increase, reducing the reactant activity area. To solve this problem, a variety of methods have been developed.

For example, an initial impregnation method has been frequently used to prepare platinum catalysts. But this method has a drawback that when the amount of the supported metal becomes larger, the average size of the platinum catalyst particles becomes larger and the size distribution thereof becomes widened.

U.S. Pat. No. 4,186,110 suggests a precipitation method in which platinum is reduced in liquid phase by transforming a carbon support body and slurry of water to a base, injecting a platinum chloride acid solution, and adding a reducing agent such as formaldehyde. Further, U.S. Pat. No. 5,068,161 suggests a method for preparing a catalyst of up to 60 wt % supported platinum with respect to the entire catalyst weight using the method.

Such precipitation method, however, produces a catalyst with nonuniform distribution of platinum particles, although it is simple and suitable for mass production.

A colloid method has been suggested, in which minute platinum particles are prepared in an aqueous solution or an organic solution, and the platinum particles are adsorbed to a carbon support body. The preparation process, however, is complex and the sizes of platinum particles produced are varied depending on the factors such as pH and temperature. In addition, the time for adsorption is relatively long.

Further, Korean Patent Laid-open Publication No. 2004-88288 suggests a platinum/support body catalyst transformed into a base by adding a pH regulating material to support platinum, the density of the pH regulating material is not uniform partially and the platinum particles are not uniformly distributed, which prevents platinum catalyst from being prepared with a high reproducibility.

The information disclosed in this Background of the Invention section is only for enhancement of understanding of the background of the invention and should not be taken as an acknowledgement or any form of suggestion that this information forms the prior art that is already known to a person skilled in the art.

Accordingly, there is thus a need for a method for preparing a highly dispersed supported platinum catalyst having an improved platinum particle sizes and distribution.

SUMMARY OF THE INVENTION

In one aspect, a method for preparing a highly dispersed supported platinum catalyst is provided, which comprises the step of adding a reducing agent to a mixture of a platinum precursor and a carbon support, wherein the reducing agent is prepared by mixing ethylene glycol and sodium borohydride.

A preferred embodiment of the present invention may comprise the steps of: (a) mixing ethylene glycol and sodium borohydride at a mole ratio of 1:0.01 to 1:0.1 at a temperature of 0 to 50° C. for thirty minutes to three hours to prepare a complex reducing agent; (b) dispersing a platinum precursor and a carbon support body in a solvent at a mole ratio of 1:9 to 8:2; (c) preparing a mixed solution of the platinum precursor, the carbon support body, and the complex reducing agent by mixing the complex reducing agent in the dispersed solvent at a temperature of 0 to 50° C. for thirty minutes to three hours; (d) heating the mixed solution of the platinum precursor, the carbon support body, and the complex reducing agent at a temperature of 40 to 80° C. for three to ten hours; and (e) adding a hydrochloric acid solution to the heat-treated mixed solution of the platinum cursor, the carbon support body, and the complex reducing agent at a volume ratio of 0.5:1 to 2:1 at a temperature of 0 to 50° C. for twenty minutes to two hours.

Preferably, the method provided by the present invention may further comprise the step of separation. The separation may be conducted by filtration.

A preferred solvent may include, not limited to, alcohol.

To prepare a mixed solution of the platinum precursor, the carbon support body, and the complex reducing agent, preferably, 1 mole of platinum precursor and 6 to 15 moles of complex reducing agent are used.

In another aspect, fuel cells are provided that comprise a catalyst prepared by a described method.

In a further aspect, motor vehicles are provided that comprise such fuel cell.

It is understood that the term "vehicle" or other similar term as used herein is inclusive of motor vehicles in general such as passenger automobiles, buses, trucks, various commercial vehicles, and the like.

Other aspects of the invention are discussed infra.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION

Figure 1:
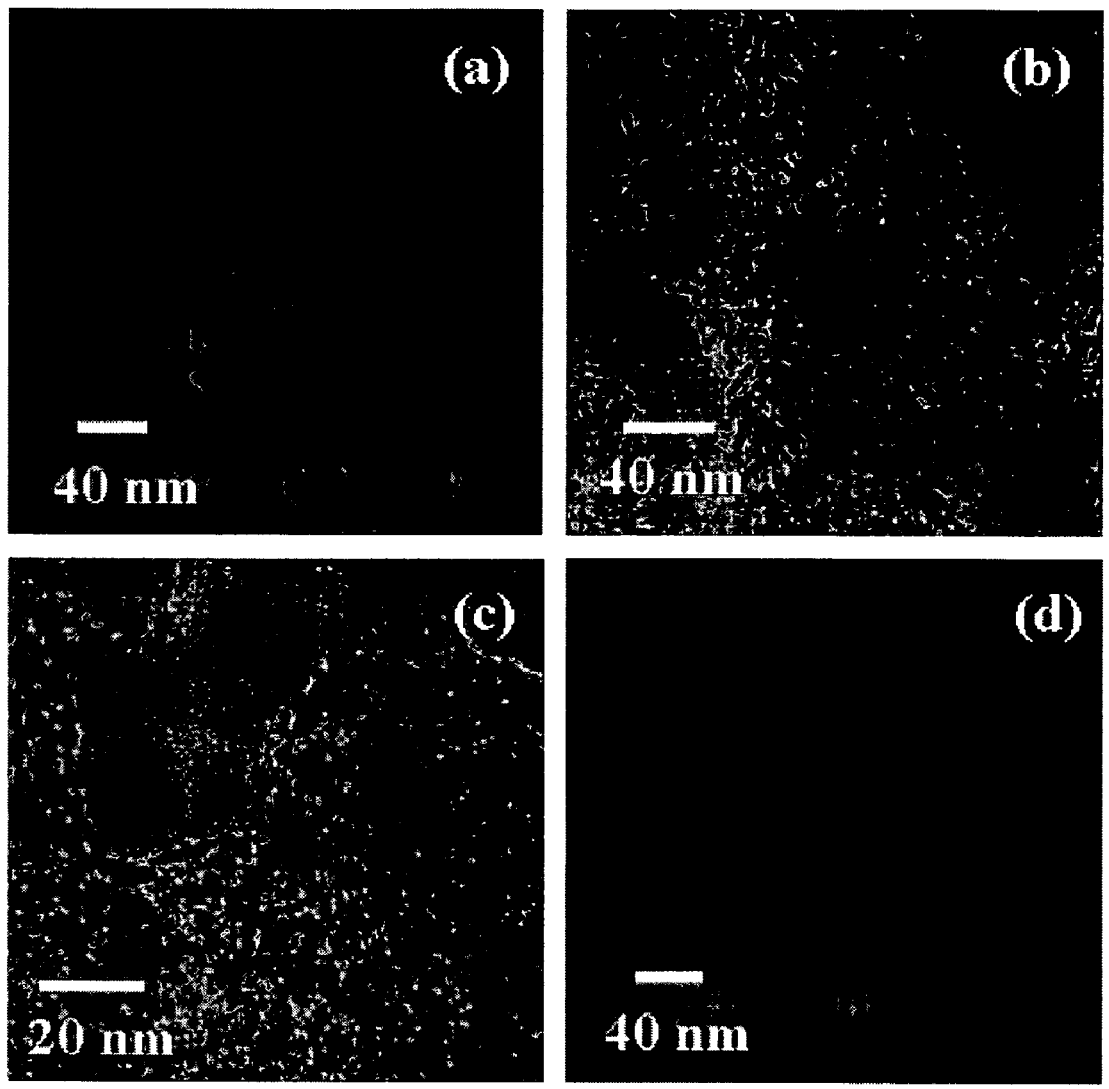
FIG. 1a is a transmission electron microscope observation result of 40 wt % of a platinum/carbon catalyst prepared by reducing platinum chloride using sodium borohydride in distilled water.
FIG. 1b is a transmission electron microscope observation result of 40 wt % of a platinum/carbon catalyst prepared by reducing platinum chloride using sodium borohydride in ethylene glycol.
FIG. 1c is a transmission electron microscope observation result of 40 wt % of a platinum/carbon catalyst prepared by reducing platinum chloride using a complex reducing agent.
FIG. 1d is a transmission electron microscope observation result of 40 wt % of a platinum/carbon catalyst commercially used conventionally.

As discussed above, in one aspect, a method for preparing a highly dispersed supported platinum catalyst is provided, which comprises the step of adding a reducing agent to a mixture of a platinum precursor and a carbon support, wherein the reducing agent is prepared by mixing ethylene glycol and sodium borohydride.

A preferred embodiment of the present invention may comprise the steps of: (a) mixing ethylene glycol and sodium borohydride at a mole ratio of 1:0.01 to 1:0.1 at a temperature of 0 to 50° C. for thirty minutes to three hours to prepare a complex reducing agent; (b) dispersing a platinum precursor and a carbon support body in a solvent at a mole ratio of 1:9 to 8:2; (c) preparing a mixed solution of the platinum precursor, the carbon support body, and the complex reducing agent by mixing the complex reducing agent in the dispersed solvent at a temperature of 0 to 50° C. for thirty minutes to three hours; (d) heating the mixed solution of the platinum precursor, the carbon support body, and the complex reducing agent at a temperature of 40 to 80° C. for three to ten hours; and (e) adding a hydrochloric acid solution to the heat-treated mixed solution of the platinum cursor, the carbon support body, and the complex reducing agent at a volume ratio of 0.5:1 to 2:1 at a temperature of 0 to 50° C. for twenty minutes to two hours.

First, in order to prepare the complex reducing agent, sodium borohydride may be slowly added to ethylene glycol. The mole ratio of the ethylene glycol and the sodium borohydride is 1:0.01 to 1:0.1. In the mole ratio of below 1:0.01, the platinum ions may not be completely reduced. On the other hand, in the mole ratio of over 1:0.1, to obtain the same result as in the case of the mole ratio of 1:0.01 to 1:0.1, substantially more amount of the reducing agent is required.

To prepare the complex reducing agent, ethylene glycol and sodium borohydride may suitably be mixed at a temperature of 0 to 50° C. for thirty minutes to 3 hours. At a temperature of below 0 degrees Celsius, since ethylene glycol and sodium borohydride are slowly reacted, the time for preparing the complex reducing agent can be long, which may prevent the complex reducing agent from being produced. To the contrary, at a temperature of over 50 degrees Celsius, since ethylene glycol and sodium borohydride can be intensively reacted, a problem of safety can occur even if the complex reducing agent is prepared. If the preparation time is below thirty minutes, the reaction may not be sufficiently performed and the complex reducing agent cannot be manufactured. By contrast, if the preparation time is over three hours, no further result can be obtained other than the result as in the case of thirty minutes to three hours.

Thereafter, a platinum precursor and a carbon support may preferably be mixed in a solvent. Preferably, the mole ratio of the platinum precursor and the carbon support body is 1:9 to 8:2. In the case of a mole ratio of below 1:9, the platinum quantity in the prepared catalyst may be too low to be used as an electrochemical reacting catalyst for a fuel cell. On the other hand, in the case of a mole ratio of over 8:2, the platinum quantity may be so high as to prepare a highly dispersed catalyst.

Suitably, the complex reducing agent may be agitated and slowly added to the alcohol solution containing the platinum precursor and the carbon support body. Preferably, alcohol may be used as the solvent for the platinum precursor and the carbon support body. One or two kind of mixture selected from ethanol, propanol, and ethylene glycol also may be used. 6 to 15 moles of the complex reducing agent are used with respect to 1 mole of the precursor. In the case of a mole ratio of below 1:6, the platinum precursor cannot be completely reduced. Further, in the case of a mole ratio of 1:15, even with more amount of the complex reducing agent used, the same result as in the case of the mole ratio of 1:6 to 1:15 can only be obtained.

The obtained mixture solution may suitably be heat-treated at a temperature of 40 to 80° C. for 3 to 10 hours to be reduced to platinum. In the case of a temperature of below 40° C., the longer time for reducing the platinum ions is required. By contrast, in the case of a temperature of over 80° C., the solvent may be evaporated at a temperature above the boiling point of the solvent and nonuniform particles of platinum may be generated. If the time is below three hours, the platinum cannot be completely reduced. On the other hand, if the time is over ten hours, even with longer reducing time, the same result as in the case of three to ten hours can only be obtained.

After the heat-treatment, preferably, 0.1 to 0.5 mole of hydrochloric acid solution may be added to the obtained mixture solution at the volume ration of 1:0.5 to 1:2 and be agitated in an agitator, suitably, at a temperature of 0 to 50° C. for twenty minutes to three hours. In the case of the volume ration of below 1:0.5, supporting speed of the platinum to a carbon support may be reduced and the support cannot be completely performed. In the case of the volume ration of over 1:2, more amount of hydrochloric acid solution is required only to obtain the same result as in the case of the mole ratio of 1:0.5 to 1:2. With respect to the temperature, in the case of the temperature of 0° C., supporting step may progress too slowly and the support cannot be completely performed. By contrast, in the case of the temperature of 50° C., the temperature of the solution is too high and the solvent may be evaporated. Also with respect to the agitation time, if the agitation time is below twenty minutes, the supporting step cannot be completed. On the other hand, if the agitation time is over three hours, longer time is required only to obtain the same result as for the agitating time of twenty minutes to three hours.

After the mixing step, a deposit may suitably be separated through filtration. Further, after washing the distilled water, the process of preparing the highly dispersed supported platinum catalyst is completed.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Preferred Embodiment 0.59 g of sodium borohydride was slowly added to 50 ml of ethylene glycol and agitated to prepare the complex reducing agent. A platinum precursor-carbon-complex reducing agent was obtained by adding the complex reducing agent to a mixture solution obtained by adding 0.333 g of platinum chloride and 0.2 g of carbon support body and agitating the mixture for four hours at 65° C. After 30 ml of 0.2 M hydrochloric acid solution was added and the thus-obtained mixture was agitated for three hours. The resulting deposit was separated through filtration and washed to prepare a 40 wt % platinum/carbon catalyst.

Comparison 1

A reducing agent obtained by dissolving 0.59 g of sodium borohydride in distilled water was added to a mixture solution obtained by adding 0.333 g of platinum chloride and 0.2 g of a carbon support body to 50 ml of distilled water and the mixture was strongly agitated at 4° C. for four hours. Then, the deposit was separated through filtration and washed by distilled water to prepare a 40 wt % platinum/carbon catalyst.

Comparison 2

To prepare a catalyst, the same method as in Comparison 1 was used, except that 100 ml of ethylene glycol was used as a solvent for dispersing the platinum chloride and the carbon support body.

Comparison 3

Alfa Aesar (Johnson-Matthey Co.) Platinum, nominally 40% on carbon black

Experiment 1

FIG. 1 shows images of the catalysts of the preferred embodiment and the comparisons, which are measured by a transmission electron microscope. As can be seen in the figures, the platinum particles supported in the catalyst show higher uniformity in size when prepared using the complex reducing agent than using comparative methods or a commercial catalyst.

Experiment 2

Figure 2:
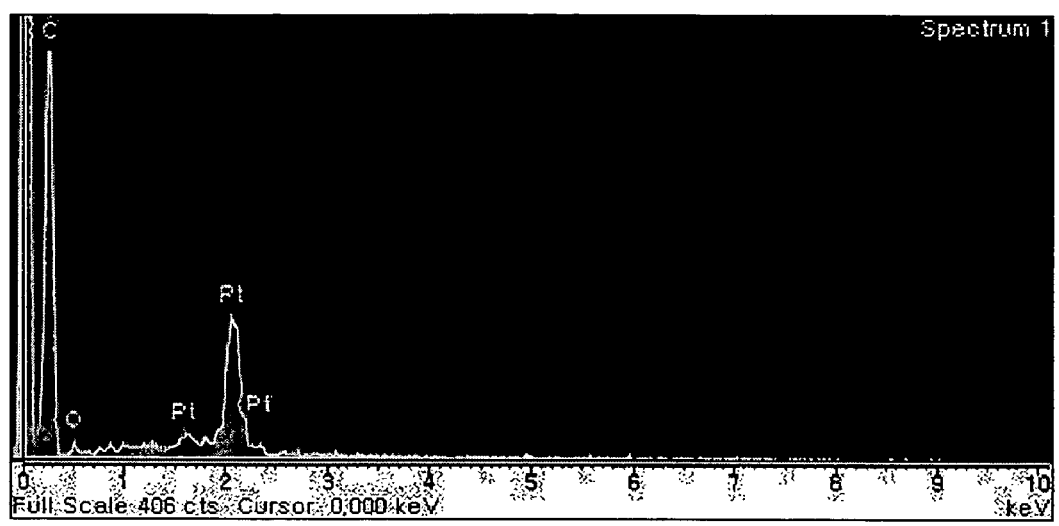
FIG. 2 is a fixed quantity analyzing result of the supported platinum catalyst of FIG. 1c by using an energy dispersing X-ray spectroscope.

FIG. 2 is a fixed quantity analyzing result of the supported platinum catalyst of FIG. 1c using the complex reducing agent of the present invention by using an energy dispersing X-ray spectroscope. As shown in the figure, it can be seen that 40 wt % platinum is supported by carbon.

Experiment 3

Figure 3:
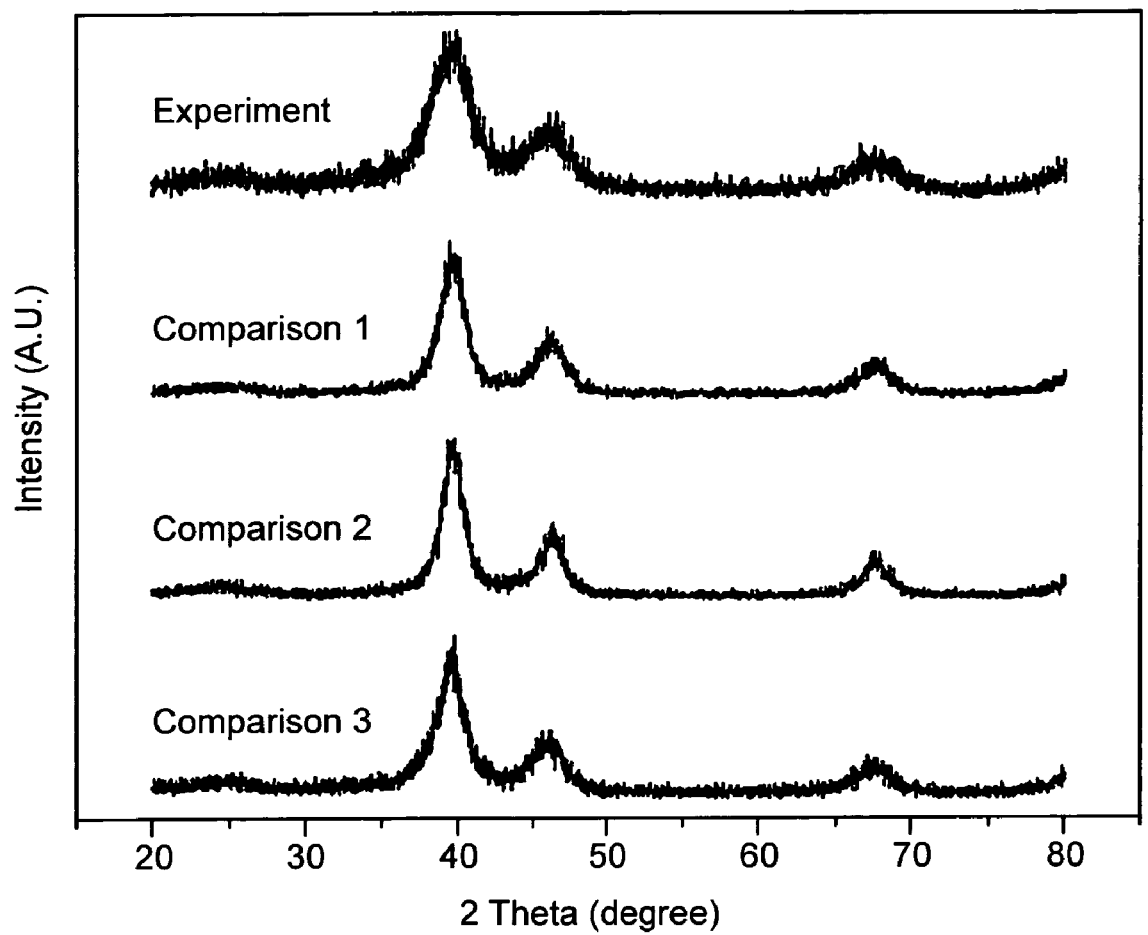
FIG. 3 is a $\theta$-2$\theta$ curve according to an X-ray diffraction analysis of the supported platinum catalyst of FIG. 1.

FIG. 3 is a θ-2θ curve according to an X-ray diffraction analysis of the supported platinum catalyst prepared according to the present invention and the catalyst for comparisons. The sizes of the platinum particles dispersed in the carbon support body are shown as peak widths of the platinum 220 of an XRD curve. The surface area of the platinum is calculated on the assumption that the shapes of the platinum particle are spherical. The results are represented in Table 1.

TABLE 1

| Classification | Quantity of supported platinum (wt %) | Size of platinum (nm) | Surface area of platinum (m²/g) |
| --- | --- | --- | --- |
| Preferred embodiment | 40 | 2.9 | 96 |
| Comparison 1 | 40 | 3.3 | 84 |
| Comparison 2 | 40 | 5.7 | 49 |
| Comparison 3 | 40 | 3.6 | 78 |

In Table 1, the catalyst prepared according to the present invention has particle size which is 9 to 20% of commercial catalysts having the same wt % and has surface area which is 107 to 123% of the commercial catalysts.

Experiment 4

The degrees of electrochemical dispersion of the 40 wt % supported platinum catalyst prepared according to the present invention and a commercial product (Alfa Aesar (Johnson-Matthey Company)) were measured to compare the catalytic activities. Formula 1 was used after measuring the change of current generated when voltages were applied in an electrolyte solution containing 0.5 M sulfuric acid.

$$S_{electro} = \frac{Q \times 100}{vcL_{pt}} \quad \text{Formula 1}$$

In Formula 1, $S_{electro}$ is a value representing the electrochemically measured dispersion. Further, v is the voltage value (mV/sec) applied per second. c is a constant calculated when the catalyst is dispersed to an actual work electrode in a single layer. $L_{Pt}$ means the quantity of the actually supported platinum.

Figure 4:
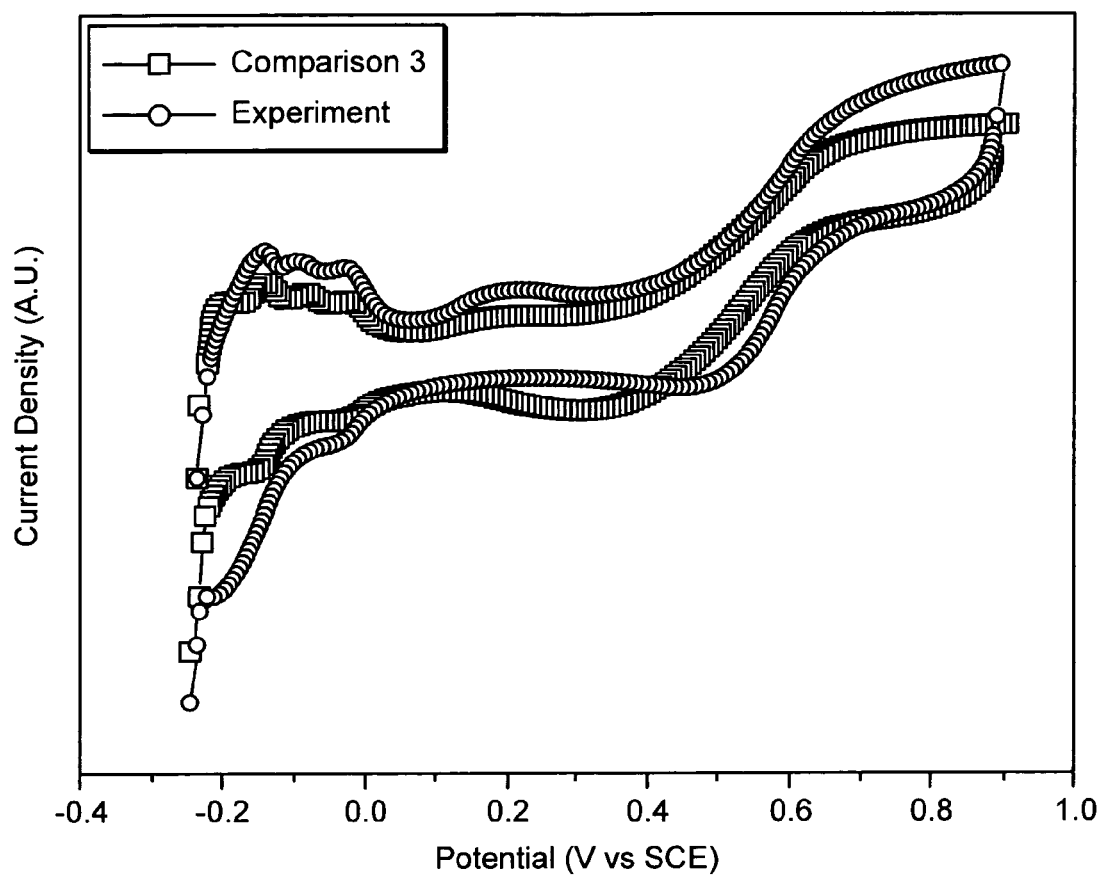
FIG. 4 is a circulation voltage current curve representing the electrochemical characteristics of the supported platinum catalyst of FIG. 1.

The dispersion of the actual catalyst is shown to be proportional to the value of $S_{electro}$ which can be seen in FIG. 4. In the case of the present invention, the value of $S_{electro}$ is 83 m²/g and in the case of a marketed product, it is 65 m²/g. Therefore, the platinum catalyst prepared according to the present invention has an activity which is 127% of the marketed product.

As mentioned above, according to the method for preparing a highly dispersed supported catalyst, since the preparation conditions hardly affect the sizes and distribution of the final platinum particles, highly dispersed supported platinum catalyst of a minute size can be prepared. Further, the highly dispersed supported platinum catalyst according to the present invention can be used as a catalyst for a low temperature type fuel cell, thereby improving the efficiency of the fuel cell.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a highly dispersed supported platinum catalyst, which comprises the step of adding a reducing agent to a mixture of a platinum precursor and a carbon support, wherein the reducing agent is prepared by mixing ethylene glycol and sodium borohydride, and ethylene glycol and sodium borohydride are mixed at a mole ratio of 1:0.01 to 1:0.1, and the mixing is conducted at a temperature of 0 to 50° C. for thirty minutes to three hours.

2. The method of claim 1, wherein 1 mole of platinum precursor and 6 to 15 moles of complex reducing agent are used to prepare a mixed solution of the platinum precursor, the carbon support body, and the complex reducing agent.

3. A method for preparing a highly dispersed supported platinum catalyst, which comprises:
   (a) mixing ethylene glycol and sodium borohydride at a mole ratio of 1:0.01 to 1:0.1 at a temperature of 0 to 50° C. for thirty minutes to three hours to prepare a complex reducing agent;
   (b) dispersing a platinum precursor and a carbon support body in a solvent at a mole ratio of 1:9 to 8:2;
   (c) preparing a mixed solution of the platinum precursor, the carbon support body, and the complex reducing agent by mixing the complex reducing agent in the dispersed solvent at a temperature of 0 to 50° C. for thirty minutes to three hours;
   (d) heating the mixed solution of the platinum precursor, the carbon support body, and the complex reducing agent at a temperature of 40 to 80° C. for three to ten hours; and
   (e) adding a hydrochloric acid solution to the heat-treated mixed solution of the platinum precursor, the carbon support body, and the complex reducing agent at a volume ratio of 0.5:1 to 2:1 at a temperature of 0 to 50° C. for twenty minutes to two hours.

4. The method of claim 3, further comprising the step of separation.

5. The method of claim 4, the separation is conducted by filtration.

6. The method of claim 3, wherein the solvent is alcohol.

* * * * *